United States Patent [19]

Mayer

[11] 3,948,288
[45] Apr. 6, 1976

[54] HYDRAULIC ACCUMULATOR
[75] Inventor: James R. Mayer, Denver, Colo.
[73] Assignee: Gardner-Denver Company, Dallas, Tex.
[22] Filed: Dec. 13, 1974
[21] Appl. No.: 532,434

[52] U.S. Cl. ............................................. 138/30
[51] Int. Cl.² ...................................... F16L 55/04
[58] Field of Search .................................. 138/30

[56] References Cited
UNITED STATES PATENTS

| | | | |
|---|---|---|---|
| 2,283,439 | 5/1942 | Herman | 138/30 |
| 2,339,076 | 1/1944 | Huber | 138/30 |
| 2,343,320 | 11/1944 | Parker | 138/30 |
| 2,543,585 | 2/1957 | Miller | 138/30 |
| 2,861,595 | 11/1958 | Pier | 138/30 |
| 3,066,699 | 12/1962 | Peet | 138/30 |
| 3,288,168 | 11/1966 | Mercier et al. | 138/30 |
| 3,333,604 | 8/1967 | Birdwell | 138/30 |
| 3,346,014 | 10/1967 | Jacuzzi | 138/30 |

Primary Examiner—Richard C. Queisser
Assistant Examiner—Charles Gorenstein
Attorney, Agent, or Firm—Michael E. Martin

[57] ABSTRACT

A flexible diaphragm for a hydraulic fluid accumulator is provided with a plurality of concentric circular ridges for engagement with the wall surface of the accumulator housing between concentric circular rows of fluid discharge openings formed in the housing. The ridges maintain the diaphragm in spaced relation to the discharge openings to prevent extrusion of the diaphragm into the discharge openings.

2 Claims, 3 Drawing Figures

HYDRAULIC ACCUMULATOR

BACKGROUND OF THE INVENTION

This invention pertains to an improved construction of a gas charged hydraulic pressure accumulator for use in hydraulic fluid systems. In gas charged hydraulic accumulators using flexible diaphragms for separating the gas chamber from the hydraulic liquid chamber various means have been proposed for preventing the extrusion of the diaphragm into the liquid discharge port and the resultant damage or rupture which may occur. U.S. Pat. No. 2,543,585 to R. S. Miller discloses a construction for a hydraulic accumulator in which a two-part metal disc is fixed to the diaphragm to seat on the discharge port of the accumulator. U.S. Pat. Nos. 2,399,444 and 2,874,721 to J. Mercier disclose flexible materials used for construction of the discharge port itself to prevent diaphragm extrusion. The present invention contemplates improvements in the functional aspects of gas charged flexible diaphragm hydraulic accumulators as well as in economy of manufacture of such devices.

SUMMARY OF THE INVENTION

The present invention provides for a construction of a flexible diaphragm for a hydraulic accumulator whereby the tendency for extrusion of the diaphragm into the hydraulic fluid discharge port is substantially eliminated. Accordingly, the reliability and continued proper functioning of such devices is greatly improved.

The present invention also provides a hydraulic accumulator of the flexible diaphragm type having improved means for guiding the diaphragm into properly aligned engagement with the accumulator housing in the vicinity of the liquid discharge port to prevent extrusion of the diaphragm through the discharge port and to reduce the tendency for the diaphragm to trap hydraulic fluid between the diaphragm and the walls of the accumulator housing.

The accumulator of the present invention is further characterized as having an improved hydraulic fluid discharge port configuration which provides maximum flow area together with sufficient supporting structure to prevent extrusion of the accumulator diaphragm into or through the port itself.

The present invention also contemplates a flexible diaphragm which is formed of a molded flexible material and is molded in the configuration which the diaphragm normally assumes when in operation. Accordingly, the diaphragm is in a relaxed condition during normal operation and the diaphragm is not under severe stress during a major portion of the time that the associated hydraulic system is operating.

The present invention further provides a hydraulic accumulator derived from components which are economical to manufacture and reliable in operation.

DESCRIPTION OF THE PREFERRED EMBODIMENT

Figure 1:
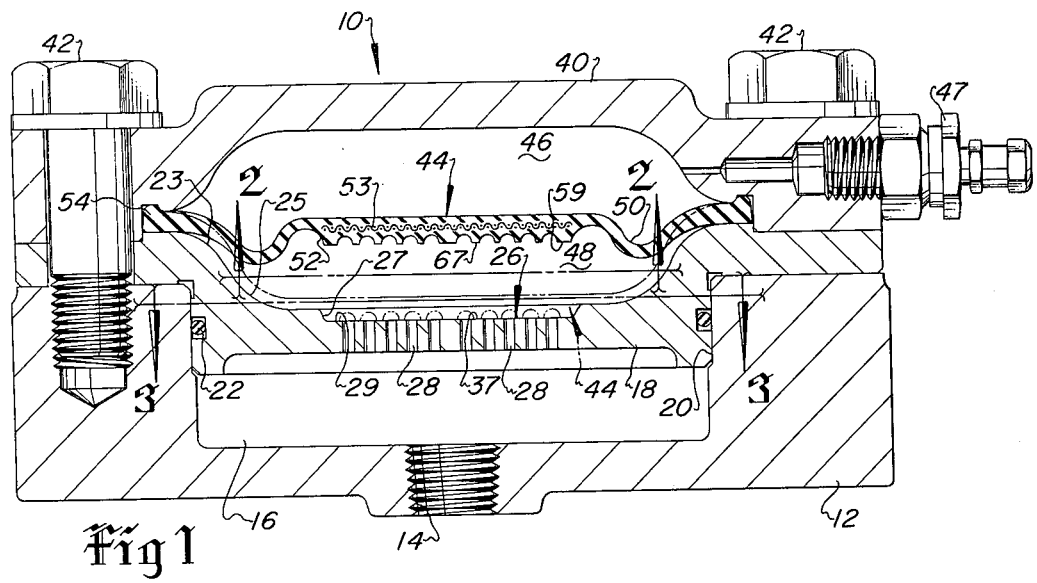
FIG. 1 is a cross section of a gas charged hydraulic accumulator in accordance with the present invention.
Figure 3:
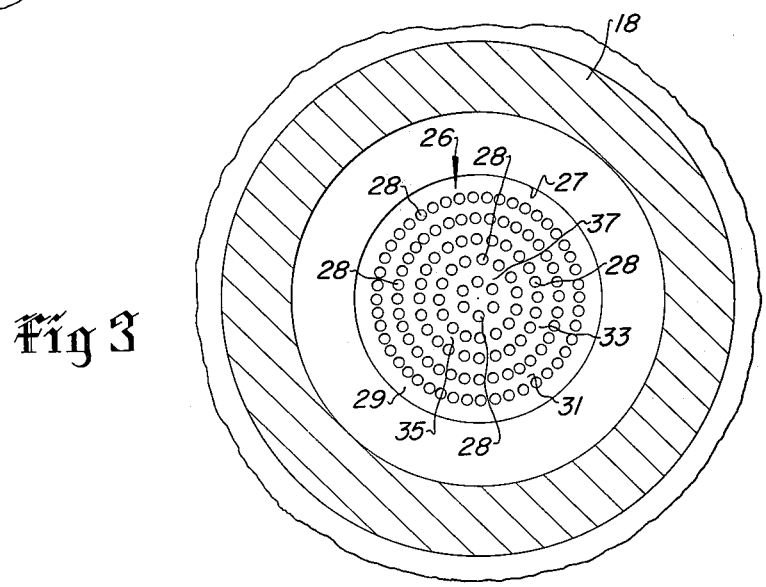
FIG. 3 is a view taken from the line 3—3 of FIG. 1.

Referring to FIG. 1 of the drawing a gas charged hydraulic accumulator is shown in cross section and generally designated by the numeral 10. The accumulator 10 comprises a housing member 12 having an opening 14 and an enlarged cylindrical chamber portion 16. The accumulator 10 also includes a base member 18 disposed in the chamber 16 and in sealing engagement with the cylindrical side wall 20 of the chamber by means of an O-ring 22. As shown in FIG. 3 also, the member 18 is formed with a bowl-shaped depression formed by a convex surface 23 contiguous with a concave surface 25, and including a circular recess delimited by a sloping side wall 27. The member 18 further includes a series of concentric circular rows of openings 28 which comprise port means opening into the chamber 16. The arrangement of the concentric rows of openings 28 provides a series of continuous concentric surfaces 29, 31, 33, 35, and 37 intermediate the rows of openings. The member 18 is clamped between the housing member 12 and a cover member 40 by a plurality of bolts 42 threaded into the housing member.

The accumulator 10 also includes an improved diaphragm generally designated by numeral 44. The diaphragm 44 is formed as a relatively thin sheet of flexible elastomeric or rubberlike material which is impervious to gas or hydraulic fluids. The diaphragm 44 divides the interior space formed between the cover 40 and the member 18 into chambers 46 and 48. The chamber 46 is charged with gas to a predetermined pressure by way of a suitable valve 47. The chamber 48, being in communication with the openings 28 and the chamber 16, is adapted to receive hydraulic fluid therein to be acted on by the diaphragm 44 in a known way for maintaining desired pressure and flow conditions in a hydraulic system in communication with the opening 14.

Frequently, in many hydraulic systems the hydraulic fluid will be forced out of the accumulator chamber 48 sufficiently to cause forcible engagement of the wall surface 25 by the diaphragm due to the gas pressure acting thereon. The gas pressure acting on the diaphragm is often great enough to tend to distend or extrude the diaphragm through the hydraulic fluid discharge opening in the accumulator causing rupture of the diaphragm or blockage of the opening itself. The diaphragm 44 together with the configuration of the discharge openings 28 in the member 18 are provided to prevent such occurrence and thereby improve the operation of hydraulic accumulator devices of the general type disclosed herein.

Figure 2:
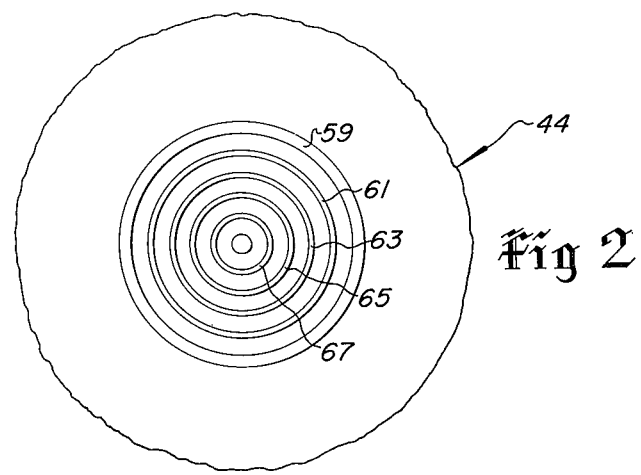
FIG. 2 is a view taken from line 2—2 of FIG. 1.

The diaphragm 44 is molded in a generally circular shape and in the as molded condition has a curved annular fold 50. The central portion of the diaphragm 44 is defined by a thickened portion 52 which is only slightly smaller in diameter than the recess 26 in the member 18. A suitable reinforcement comprising a metal or plastic wire mesh 53 is imbedded in the portion 52. The outer circumference of the diaphragm 44 is formed with a ridge or thickened edge 54 which facilitates sealingly clamping of the diaphragm between the cover member 40 and the base member 18. Referring to FIG. 2 also, the thickened portion 52 of the diaphragm is formed to have a plurality of molded concentric circular ridges 59, 61, 63, 65, and 67 which are formed by intermediate grooves. The ridges 59, 61, 63, 65, and 67 are dimensioned to respectively be engaged with the annular concentric surfaces 29, 31, 33, 35 and 37 which are disposed around and intermediate the annular rows of openings 28. Accordingly, as shown by the phantom position of the diaphragm 44 in FIG. 1, a position which would occur when the hydraulic fluid pressure was substantially reduced by an outflow of fluid from the chamber 48, the ridges engage the annular surfaces of the member 18 to hold the diaphragm in spaced relationship with respect to the openings 28. In this way the tendency for the diaphragm to be forcibly pushed or extruded through the openings 28 is substantially eliminated under the pressures that the diaphragm is normally subjected to. Moreover, the sloping sidewall 27 is cooperable with the outermost ridge 59 of the diaphragm 44 to align all of the ridges with the corresponding surfaces on the member 18 as the diaphragm moves into engagement therewith.

The position of the diaphragm 44 as shown by the solid lines in FIG. 1 is the normal working position. The pressure and flow changes which occur in the system will normally cause the diaphragm to move either way from the position shown as, for example, to the position shown in phantom which is caused by a large outflow of hydraulic fluid from the accumulator 10. In accordance with the present invention the diaphragm 44 is molded or formed in the position shown in FIG. 1 so that the diaphragm material is substantially relaxed when the fold 50 is formed and accordingly the fatigue life of the diaphragm will not be greatly effected by movement due to minor pressure fluctuations or perturbations. Moreover, the respective convex and concave curved surfaces 23 and 25 are cooperable with the diaphragm 44 to become progressively engaged with the diaphragm to prevent trapping of fluid in the chamber as the diaphragm moves to the position shown by the dashed lines in FIG. 1.

What is claimed is:

1. A hydraulic accumulator comprising:
    housing means divided into gas and liquid chambers by a diaphragm;
    said housing means including liquid port means comprising a plurality of annular concentric rows of openings communicating with said liquid chamber; and
    said diaphragm being characterized by a sheet of flexible rubberlike material molded to form a plurality of annular concentric raised ridges formed by a thickened portion of said sheet, said ridges being spaced apart for engagement with corresponding continuous annular concentric surfaces formed by a wall surface of said housing means and between said rows of openings for holding said diaphragm in spaced relationship to said port means.

2. The invention set forth in claim 1 wherein:
    said port means are formed in a circular recess formed in said housing means and delimited by a circumferential sloping sidewall conforming substantially to the outside diameter of the outermost raised ridge for aligning said raised ridges with said annular surfaces upon movement of said diaphragm into the vicinity of said openings.

* * * * *